(12) United States Patent
Bronfenbrenner et al.

(10) Patent No.: US 12,194,449 B2
(45) Date of Patent: Jan. 14, 2025

(54) LOW BULK DENSITY, HIGH GEOMETRIC SURFACE AREA HONEYCOMB BODIES

(71) Applicant: CORNING INCORPORATED, Corning, NY (US)

(72) Inventors: David Jack Bronfenbrenner, Painted Post, NY (US); Michael James Lehman, Canisteo, NY (US)

(73) Assignee: Corning Incorporated, Corning, NY (US)

( * ) Notice: Subject to any disclaimer, the term of this patent is extended or adjusted under 35 U.S.C. 154(b) by 717 days.

(21) Appl. No.: 17/601,594

(22) PCT Filed: Apr. 8, 2020

(86) PCT No.: PCT/US2020/027204
§ 371 (c)(1),
(2) Date: Oct. 5, 2021

(87) PCT Pub. No.: WO2020/214462
PCT Pub. Date: Oct. 22, 2020

(65) Prior Publication Data
US 2022/0176368 A1    Jun. 9, 2022

Related U.S. Application Data

(60) Provisional application No. 62/835,671, filed on Apr. 18, 2019.

(51) Int. Cl.
*B01J 35/31*    (2024.01)
*B01D 46/24*    (2006.01)
(Continued)

(52) U.S. Cl.
CPC .......... *B01J 35/56* (2024.01); *B01D 46/2425* (2013.01); *B01D 46/2429* (2013.01);
(Continued)

(58) Field of Classification Search
CPC ... B01J 35/31; B01J 35/56; B01J 35/61; B01J 37/0018; B01J 37/082; B01D 46/2425;
(Continued)

(56) References Cited

U.S. PATENT DOCUMENTS 3,885,977 A * 5/1975 Lachman .............. C04B 35/195
428/116
5,629,067 A * 5/1997 Kotani .................. F01N 3/2828
428/116

(Continued)

FOREIGN PATENT DOCUMENTS

CN    101939271 A    1/2011
CN    105579208 A    5/2016
(Continued)

OTHER PUBLICATIONS

Chinese Patent Application No. 202080029647.0, Office Action dated Jun. 14, 2022, 5 pages (English Translation Only), Chinese Patent Office.
(Continued)

*Primary Examiner* — Cam N. Nguyen
(74) *Attorney, Agent, or Firm* — Kevin M. Able

(57) ABSTRACT

Ceramic honeycomb bodies and methods for then manufacture are provided. The ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$.

20 Claims, 16 Drawing Sheets

(51) Int. Cl.
  *B01D 53/94* (2006.01)
  *B01J 35/56* (2024.01)
  *B01J 35/61* (2024.01)
  *B01J 37/00* (2006.01)
  *B01J 37/08* (2006.01)
  *F01N 3/28* (2006.01)

(52) U.S. Cl.
  CPC ... *B01D 46/24491* (2021.08); *B01D 46/2455* (2013.01); *B01D 46/247* (2013.01); *B01D 46/2474* (2013.01); *B01D 46/2482* (2021.08); *B01D 46/2484* (2021.08); *B01D 46/249* (2021.08); *B01D 46/2492* (2021.08); *B01D 46/2498* (2021.08); *B01J 35/31* (2024.01); *B01J 35/61* (2024.01); *B01J 37/0018* (2013.01); *B01J 37/082* (2013.01); *B01D 53/94* (2013.01); *F01N 3/2828* (2013.01); *F01N 2330/06* (2013.01)

(58) Field of Classification Search
  CPC .......... B01D 46/2429; B01D 46/24491; B01D 46/24492; B01D 46/2455; B01D 46/247; B01D 46/2474; B01D 46/2482; B01D 46/2484; B01D 46/249; B01D 46/2498; B01D 53/94; F01N 3/2828; F01N 2330/06
  USPC ......................................................... 502/439
  See application file for complete search history.

(56) References Cited

U.S. PATENT DOCUMENTS

| | | | |
|---|---|---|---|
| 5,866,080 A | 2/1999 | Day | |
| 7,442,425 B2 | 10/2008 | Fu et al. | |
| 7,572,416 B2* | 8/2009 | Alward | F01N 3/0211 29/890 |
| 7,597,948 B2* | 10/2009 | Miller | B01D 46/2462 428/116 |
| 7,618,699 B2* | 11/2009 | Beall | C04B 35/195 428/116 |
| 7,704,296 B2* | 4/2010 | Merkel | C04B 35/195 501/153 |
| 7,780,755 B2* | 8/2010 | He | C04B 38/0006 422/177 |
| 7,785,544 B2* | 8/2010 | Alward | B01D 46/521 422/179 |
| 7,887,897 B2 | 2/2011 | Lu et al. | |
| 7,927,682 B2* | 4/2011 | Beall | C04B 38/0009 428/116 |
| 8,007,731 B2* | 8/2011 | Berkey | F01N 3/0222 422/177 |
| 8,377,370 B2* | 2/2013 | Merkel | C04B 38/0006 264/630 |
| 8,501,296 B2* | 8/2013 | Merkel | C04B 35/195 428/116 |
| 8,530,029 B2 | 9/2013 | Lu et al. | |
| 9,314,727 B2* | 4/2016 | Lu | B01D 46/24495 |
| 9,808,794 B2 | 11/2017 | Brew et al. | |
| 10,328,627 B2* | 6/2019 | Lehman | B29C 48/152 |
| 11,719,142 B2* | 8/2023 | Ingram-Ogunwumi | B01D 46/2429 55/523 |
| 2007/0261378 A1 | 11/2007 | Miao et al. | |
| 2008/0220205 A1 | 9/2008 | Miwa et al. | |
| 2009/0297764 A1* | 12/2009 | Beall | C04B 38/0006 264/43 |
| 2010/0052205 A1* | 3/2010 | Brew | B28B 3/269 264/177.12 |
| 2015/0152768 A1* | 6/2015 | Arulraj | B01J 29/46 428/117 |
| 2015/0251124 A1 | 9/2015 | Okazaki | |

FOREIGN PATENT DOCUMENTS

| | | |
|---|---|---|
| EP | 1839748 A2 | 10/2007 |
| EP | 2554237 A1 | 2/2013 |
| WO | 2015/042240 A1 | 3/2015 |

OTHER PUBLICATIONS

Susan C. Lauderdale, et al., "Impact of Ceramic Substrate Web Thickness on Emission Light-Off, Pressure Drop, and Strength", SAE Int. J. Fuels Lubr., vol. 1(1), 2009, pp. 338-346.

International Search Report and Written Opinion of the International Searching Authority; PCT/US2020/027204; dated Jul. 28, 2020; 10 pages; European Patent Office.

* cited by examiner

LOW BULK DENSITY, HIGH GEOMETRIC SURFACE AREA HONEYCOMB BODIES

This is a national stage application under 35 U.S.C. § 371 of International Application No. PCT/US2020/027204, filed on Apr. 8, 2020, which claims the benefit of priority under 35 U.S.C. § 119 of U.S. Provisional Application No. 62/835,671 filed on Apr. 18, 2019, the content of which is incorporated herein by reference in its entirety.

BACKGROUND

This disclosure generally relates to low bulk density ceramic honeycomb bodies exhibiting high geometric surface area and methods of making and using the same. More particularly, the disclosure provides low bulk density cordierite ceramic honeycomb bodies exhibiting high geometric surface area, which are useful in catalytic converter substrates, such as for engine exhaust after-treatment.

Ceramic honeycomb substrates containing a catalyst such as an oxidation catalyst and a three-way catalyst are used in close-coupled applications in gasoline engine emission control to enable the substrate to heat up faster. This in turn enables the catalyst to become active sooner, resulting in reduced cold-start emissions. This problem has been addressed by automobile manufacturers by controlling engine operation during start-up, thus optimizing engine temperatures and fuel usage, which is both complicated and negatively impacts fuel economy of the vehicle. Mobile emissions catalytic converter manufacturers have addressed this issue by adding increased amounts of platinum group metals (PGM) to the washcoats that are used to coat the ceramic honeycomb substrates, which is inefficient and very expensive.

There is a need to provide improved ceramic honeycomb bodies to address cold start emissions.

SUMMARY

A first aspect of this disclosure pertains to a ceramic honeycomb body comprising an inlet face, an outlet face, and a plurality of parallel, elongate, open-ended cells formed by a web of intersecting cell walls having a web thickness ($t_w$) traversing the ceramic honeycomb body from the inlet face to the outlet face thereof, each cell defining a cell perimeter P and cell area ($A_{cell}$), the open-ended cells configured with a cell density in cells per square inch (CPSI) and defining a percentage open frontal area (% OFA) of the ceramic honeycomb body, wherein % OFA=CPSI*$A_{cell}$, the intersecting cell walls being comprised of a ceramic material having a density $\rho_c$ and a volume percentage porosity (% porosity), wherein the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$.

A second aspect of this disclosure pertains to a method of manufacturing a ceramic honeycomb body comprising an inlet face, an outlet face, and a plurality of parallel, elongate, open-ended cells formed by intersecting cell walls having a web thickness ($t_w$) traversing the ceramic honeycomb body from the inlet face to the outlet face thereof, each cell defining a perimeter P and cell area ($A_{cell}$), the open-ended cells comprising a cell density in cells per square inch (CPSI) and defining a percentage open frontal area (% OFA) of the ceramic honeycomb body, wherein % OFA=CPSI*$A_{cell}$, the intersecting cell walls comprising a ceramic material having a density pc and a volume percentage porosity (% porosity). The method comprises forming a mixture of starting materials including a pore forming agent, then extruding the mixture into a green honeycomb body, then firing the green honeycomb body to provide a formed ceramic honeycomb body comprising a predetermined CPSI and a predetermined web thickness so that the formed ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

It will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

DETAILED DESCRIPTION

Before describing several exemplary embodiments, it is to be understood that the disclosure is not limited to the details of construction or process steps set forth in the following disclosure. The disclosure provided herein is capable of other embodiments and of being practiced or being carried out in various ways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 1:
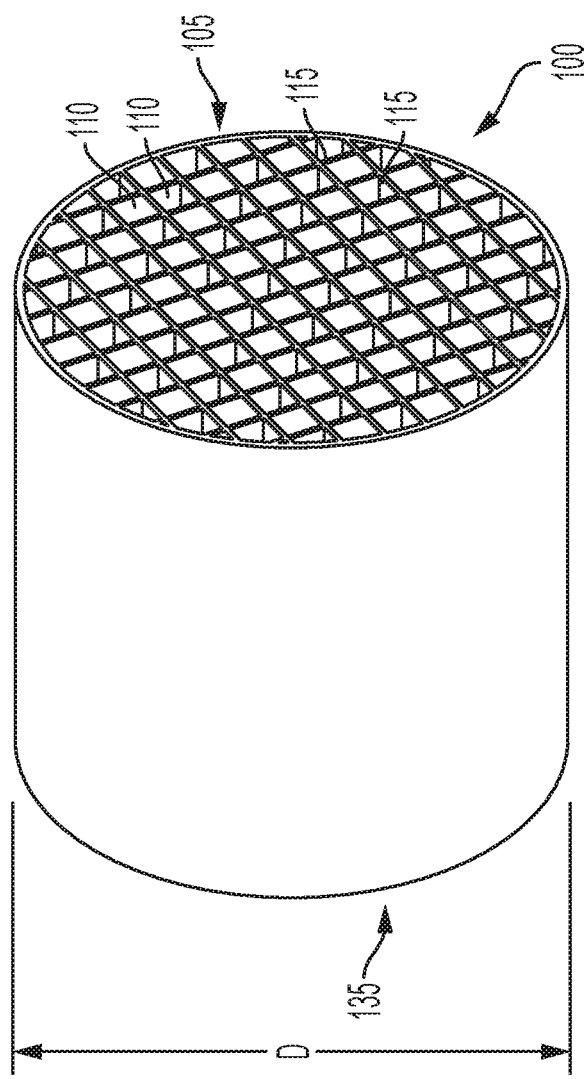
FIG. 1 is a perspective view of a honeycomb body according to one or more embodiments.

The instant disclosure provides ceramic honeycomb bodies that can be used to manufacture mobile catalysts that meet the demanding requirements of existing steady state emissions and cold start emissions, as well as meeting increasingly strict future emission regulations. With reference now to FIG. 1, an exemplary embodiment of a honeycomb body 100 comprises a plurality of cell walls 115 defining a plurality of inner channels 110. The plurality of inner channels 110 and intersecting cell walls 115 extend between a first end 105 and a second end 135 of the honeycomb body. The first end 105 may also be referred to an inlet face, and the second end 135 may be referred to an outlet face. When the honeycomb body is in use, the first end 105 or inlet face is closest to the engine exhaust, the exhaust gas enters the first end 105 or inlet face of the substrate and exits the honeycomb body 100 through the second end 135 or outlet face.

Figure 2B:
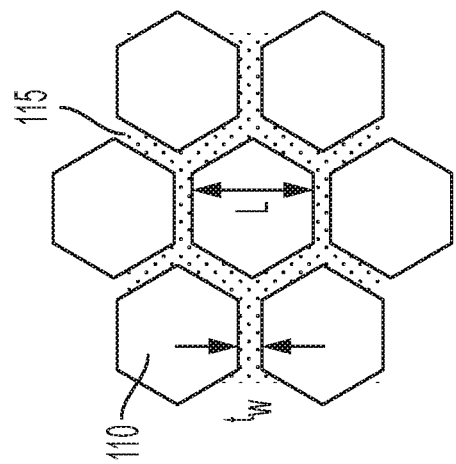
FIG. 2B is an end view of hexagonal cells of a honeycomb body according to one or more embodiments.
Figure 2A:
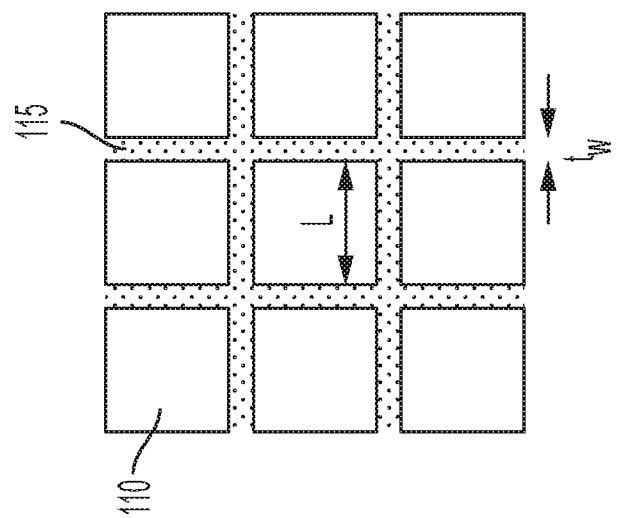
FIG. 2A is an end view of rectangular cells of a honeycomb body according to one or more embodiments.

FIG. 2A shows an end view of cells 110 that are rectangular, specifically square, in cross-section bounded by channel walls 115 having a web thickness $t_w$. FIG. 2B shows an end view of cells 110 that are hexagonal in cross-section and walls 115 having a web thickness $t_w$.

One or more embodiments pertains to a ceramic honeycomb body 100 comprising an first end 105 or an inlet face, a second end 135 or an outlet face, and a plurality of parallel, elongate, open-ended cells 110 (elongate, open-ended cells may also be referred to as channels) formed by a web of intersecting cell walls 115 having a web thickness ($t_w$) traversing the ceramic honeycomb body from the inlet face to the outlet face thereof, each cell 110 defining a cell channel perimeter P and cell channel area ($A_{cell}$), the open-ended cells 110 configured with a cell density in cells per square inch (CPSI) and defining a percentage open frontal area (% OFA) of the ceramic honeycomb body, wherein % OFA=CPSI*$A_{cell}$, the intersecting cell walls being comprised of a ceramic material having a density pc and a volume percentage porosity (% porosity), wherein the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$.

The bulk density of a honeycomb body is controlled by two main parameters, open frontal area of the honeycomb body, which is controlled by web thickness and cells per square inch (CPSI), and the density of the ceramic material, which is controlled by the base material density and the % porosity of the material. Geometric surface area (GSA) is controlled by the web thickness and cells per square inch.

Increasing GSA while minimizing bulk density is historically managed by balancing web thickness and CPSI. Lowering the web thickness increases GSA and lowers bulk density. Increasing CPSI increases GSA but also increases bulk density. Thus, to fully optimize GSA, the web thickness has to get thinner, and a thinner web thickness creates a risk to the mechanical integrity of the honeycomb body. Likewise, the CPSI has to get higher and this risks the back pressure performance of the part. This can be balanced by increasing the % porosity of the honeycomb body, which enables one to separate bulk density from the mechanical design process of the honeycomb body. According to one or more embodiments, the CPSI and web thickness can be used to optimize the GSA, MIF, and BPF space and then the porosity can be used to bring the bulk density below the desired target.

The bulk density is the weight per bulk volume of the honeycomb body. In the case of a cylindrical honeycomb body having round cross-section, bulk volume would be the cylindrical volume. The geometric surface area (GSA) is the surface area of all the surfaces within the bulk volume of the honeycomb body. The mechanical integrity factor (MIF) is derived by equating a maximum bending stress at a midpoint of the elongate cell (or channel) walls or at an intersection of the channel walls to channel wall strength. The back pressure factor is the component of the equation governing the back pressure of a flow-through substrate that corresponds to the geometry of the honeycomb body.

According to one or more embodiments, providing low bulk density and high GSA honeycomb bodies can allow an automobile manufacturer to balance meeting emissions requirements that were previously unattainable, maintaining or improving current emissions capability with greatly reduced platinum group metal (PGM) loading on the honeycomb body and maintaining or improving current emissions capability with better fuel economy. Reducing PGM loading on a honeycomb body results in a substantial cost savings.

According to one or more embodiments, equations for optimizing honeycomb bodies are provided below. In the equations below:
CPSI=cells per square inch
$t_w$=web thickness (mil)
P=perimeter of cell (in)
$A_{cell}$=Area of cell (in$^2$)
$\rho_c$=density of ceramic (g/cm$^3$)
OFA=Open Frontal Area $D_h$=Hydraulic Diameter
$L$=Length of a channel opening
The Bulk Density is provided by Equation 1.

$$\text{Bulk Density} = [1 - \% \text{ OFA}] * [(1 - \% \text{ porosity}) * \rho_c] \quad (1)$$

The percentage of Open Frontal Area (% OFA) is provided by Equation 2.

$$\% \text{ OFA} = \text{CPSI} * A_{cell} \quad (2)$$

The Geometric Surface Area (GSA) is provided by Equation 3.

$$\text{GSA} = \text{CPSI} * P \quad (3)$$

The Hydraulic Diameter ($D_h$) of the honeycomb body is provided by Equation 4.

$$\text{Hydraulic Diameter} = 4 * \frac{A_{cell}}{P} \quad (4)$$

The Back Pressure Factor (BPF) is provided by Equation 5.

$$\text{BPF} = D_h^2 * \text{OFA} \quad (5)$$

Referring first to FIG. 2A, a honeycomb body with rectangular cells, in particular, square cells, is optimized according to one or more embodiments utilizing the following equations to define parameters of a honeycomb body.

The area of the cell is provided by Equation 6.

$$A_{cell} = L^2 \quad (6)$$

The perimeter of the square channels is provided by Equation 7.

$$P = 4 * L \quad (7)$$

The length of the square channels is provided by Equation 8.

$$L = \left( \frac{1}{\sqrt{\text{CPSI}}} - t_w \right) \quad (8)$$

The geometric surface area of the square channels is provided by equation 9.

$$\text{GSA} = 4 * \text{CPSI} * \left( \frac{1}{\sqrt{\text{CPSI}}} - t_w \right) \quad (9)$$

The bulk density of the square channels is provided by Equation 10.

$$\text{Bulk Density} = \left[ 1 - \text{CPSI} \left( \frac{1}{\sqrt{\text{CPSI}}} - t_w \right)^2 \right] * [(1 - \% P) * \rho_c] \quad (10)$$

The mechanical integrity factor (MIF) is provided by Equation 11

$$\text{MIF} = \frac{t_w^2}{\frac{1}{\sqrt{\text{CPSI}}} \left( \frac{1}{\sqrt{\text{CPSI}}} - t_w \right)} \quad (11)$$

The hydraulic diameter of the square channels is provided by Equation 12.

$$\text{Hydraulic Diameter} = \left( \frac{1}{\sqrt{\text{CPSI}}} - t_w \right) \quad (12)$$

The Back Pressure Factor (BPF) is provided by Equation 13.

$$\text{BPF} = \left( \frac{1}{\sqrt{\text{CPSI}}} - t_w \right)^2 \text{CPSI} \left( \frac{1}{\sqrt{\text{CPSI}}} - t_w \right)^2 \quad (13)$$

Referring now to FIG. 2B, a honeycomb body with hexagonal cells, is optimized according to one or more embodiments utilizing the following equations to define parameters of a honeycomb body.

For a honeycomb substrate comprising hexagonal channels, properties of the honeycomb substrate according to one or more embodiments are defined as follows:

The area of the cell ($A_{cell}$) is provided by Equation 14.

$$A_{cell} = \frac{\sqrt{3}}{2} L^2 \quad (14)$$

The perimeter (P) is provided by Equation 15.

$$P = 2\sqrt{3} * L \quad (15)$$

The length (L) is provided by Equation 16.

$$L = \left( \frac{1}{\sqrt{\frac{\sqrt{3}}{2} \text{CPSI}}} - t_w \right) \quad (16)$$

The geometric surface area of the is provided by equation 17.

$$\text{GSA} = 2\sqrt{3} * \text{CPSI} * \left( \frac{1}{\sqrt{\frac{\sqrt{3}}{2} \text{CPSI}}} - t_w \right) \quad (17)$$

The Bulk Density is provided by Equation 18.

$$\text{Bulk Density} = \left[ 1 - \text{CPSI} * \frac{\sqrt{3}}{2} \left( \frac{1}{\sqrt{\frac{\sqrt{3}}{2} \text{CPSI}}} - t_w \right)^2 \right] * [(1 - \% P) * \rho_c] \quad (18)$$

The mechanical integrity factor (MIF) is provided by Equation 19.

$$\text{MIF} = \frac{t_w^2}{\frac{1}{\sqrt{\frac{\sqrt{3}}{2} \text{CPSI}}} \left( \frac{1}{\sqrt{\frac{\sqrt{3}}{2} \text{CPSI}}} - t_w \right)} \quad (19)$$

The hydraulic diameter of is provided by Equation 20.

$$\text{Hydraulic Diameter} = \left( \frac{1}{\sqrt{\frac{\sqrt{3}}{2} CPSI}} - t_w \right) \quad (20)$$

The Back Pressure Factor (BPF) is provided by Equation 21.

$$BPF = \left( \frac{1}{\sqrt{\frac{\sqrt{3}}{2} CPSI}} - t_w \right)^2 CPSI * \frac{\sqrt{3}}{2} \left( \frac{1}{\sqrt{\frac{\sqrt{3}}{2} CPSI}} - t_w \right)^2. \quad (21)$$

The bulk material density of the honeycomb body is not often used to optimize the GSA and bulk density. Bulk material density is controlled by the density of the ceramic material and the % porosity of that ceramic material. In one or more embodiments, honeycomb body is comprised of cordierite ceramic. When the ceramic body comprises cordierite, the % porosity parameter can be increased to lower the bulk density without having an impact on the GSA. Accordingly, honeycomb bodies are enabled having higher cell density and maximum GSA to still maintain honeycomb bodies having low bulk densities.

According to one or more embodiments, honeycomb bodies are provided that have a GSA that is relatively high and a low bulk density, without having to resort to very thin webs that can reduce the mechanical integrity factor and thus, make manufacturing more difficult and decrease product shape capability and canning performance.

A first embodiment of the disclosure pertains to a ceramic honeycomb body comprising an inlet face, an outlet face, and a plurality of parallel, elongate, open-ended cells formed by a web of intersecting cell walls having a web thickness ($t_w$) traversing the ceramic honeycomb body from the inlet face to the outlet face thereof. Each cell defines a cell perimeter P and cell area ($A_{cell}$), the open-ended cells configured with a cell density in cells per square inch (CPSI) and defining a percentage open frontal area (% OFA) of the ceramic honeycomb body, wherein % OFA=CPSI*$A_{cell}$. The intersecting cell walls are comprised of a ceramic material having a density $\rho_c$ and a volume percentage porosity (% porosity). In specific embodiments, the ceramic material comprises cordierite, and in some embodiments, the ceramic material consists essentially of or consists of cordierite. The ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$. It will be understood that while the specific embodiments discussed herein pertain to cells that have a rectangular (in particular, square) or hexagonal cross-section, the cross-sectional shape of the cells is not limited to rectangular and hexagonal as long as the honeycomb body is within the GSA, MIF and BPF defined by each embodiment. In one or more embodiments, the cross-sectional shape of the cells can be circular, oval or other cross-sectional shapes.

In one or more of the embodiments shown with respect to FIGS. 3A-16B, one or more of the GSA, MIF and/or BPF are varied to provide a modified honeycomb body. If the GSA is adjusted below a particular limit for the embodiment shown, then the catalytic performance of a catalytic converter comprising the honeycomb body is decreased, resulting in increased emissions from an engine utilizing a catalytic converter comprising the honeycomb body. This would require use of higher amounts of PGM on the honeycomb body, which is less cost effective. If MIF is adjusted below a particular limit for the embodiment shown, then the mechanical durability of the substrate will suffer resulting in more field failures and/or increased cost in the supply chain. If the BPF is adjusted below a particular limit for the embodiment shown, the back pressure on an engine of a vehicle that utilizes the honeycomb body becomes higher, resulting in reduced engine performance and/or reduced fuel efficiency.

Figures 3A, 3B:
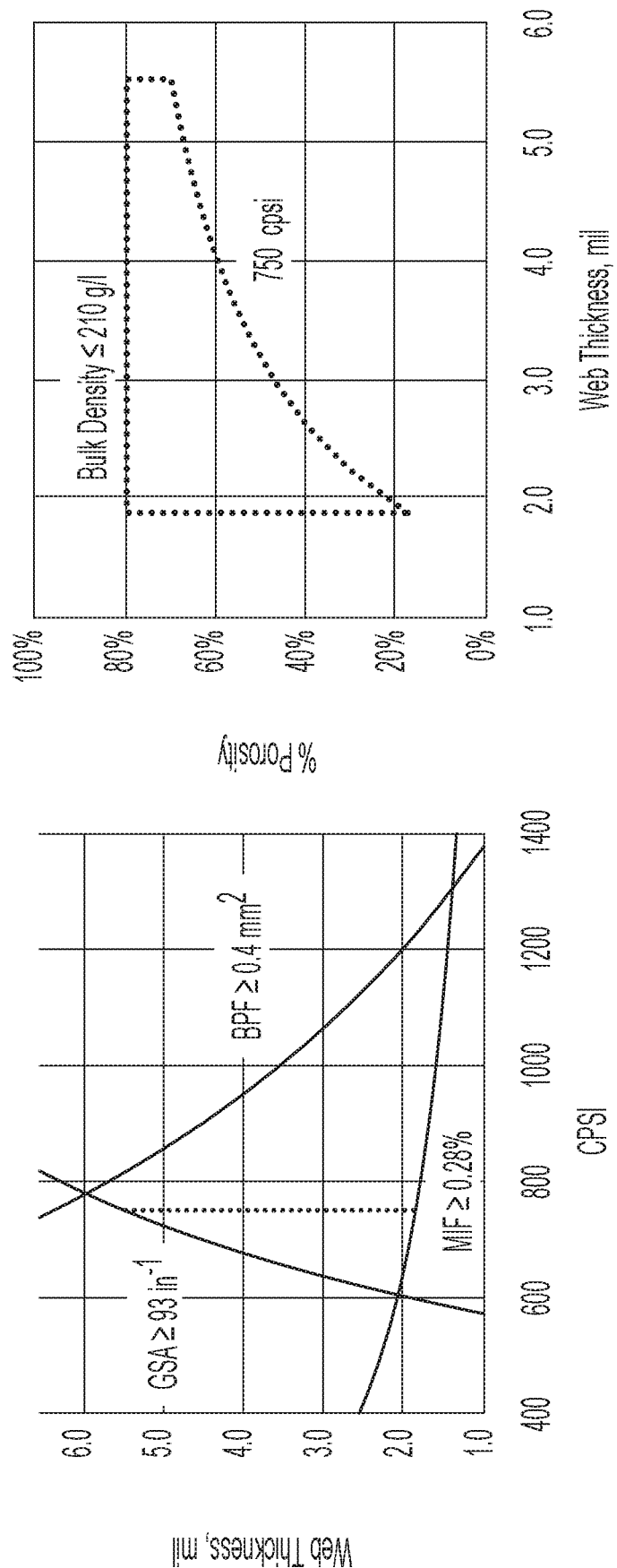
FIGS. 3A and 3B are graphs illustrating selection of parameters according to an embodiment of a cordierite honeycomb body with square cells.

In a second embodiment, the ceramic honeycomb body has cells that are rectangular, and in specific embodiments, square, in cross-section. FIGS. 3A and 3B are graphs illustrating selection of parameters according to the first embodiment with square cells, however, in alternative embodiments, the shape of the cells is not limited to square cells. FIG. 3A plots web thickness versus CPSI, and the region bounded by the GSA, MIF and BPF lines defines a range of web thickness and CPSI values encompassed by the first embodiment. FIG. 3B plots porosity against web thickness in mils for an exemplary embodiment at 750 CPSI, and the dotted line region depicts a region encompassing ranges of % porosity and web thicknesses that can be utilized and meet the range of parameters shown in FIG. 3A in accordance with the first embodiment. The % porosity of the honeycomb body can range from approximately 17% to 80% for a web thickness of about 1.9 mils (48.26 µm) and a % porosity in a range of from about 70% to about 80% for a web thickness of about 5.5 mils (139.7 µm).

Figure 4B:
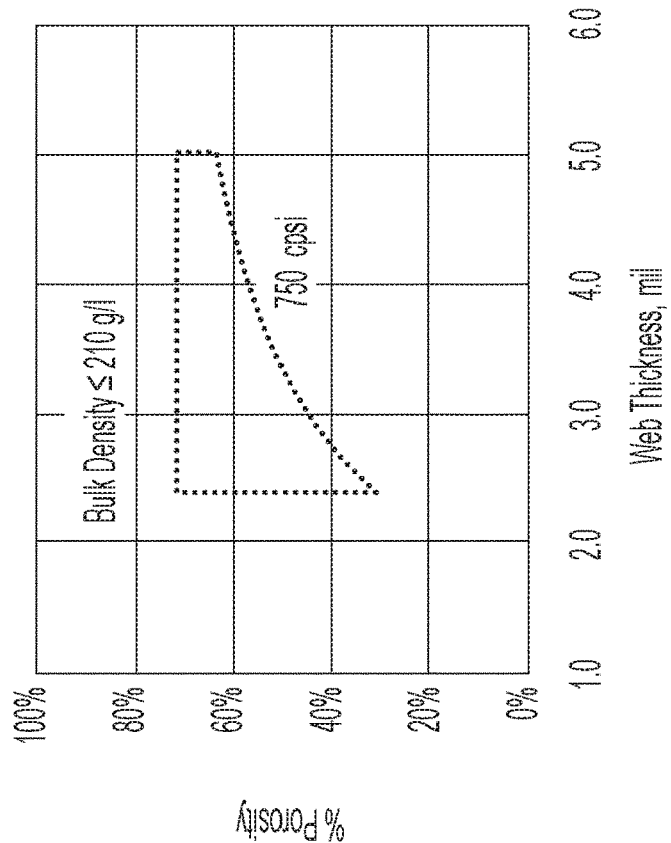
FIGS. 4A and 4B are graphs illustrating selection of parameters according to an embodiment of a cordierite honeycomb body with square cells.
Figure 4A:
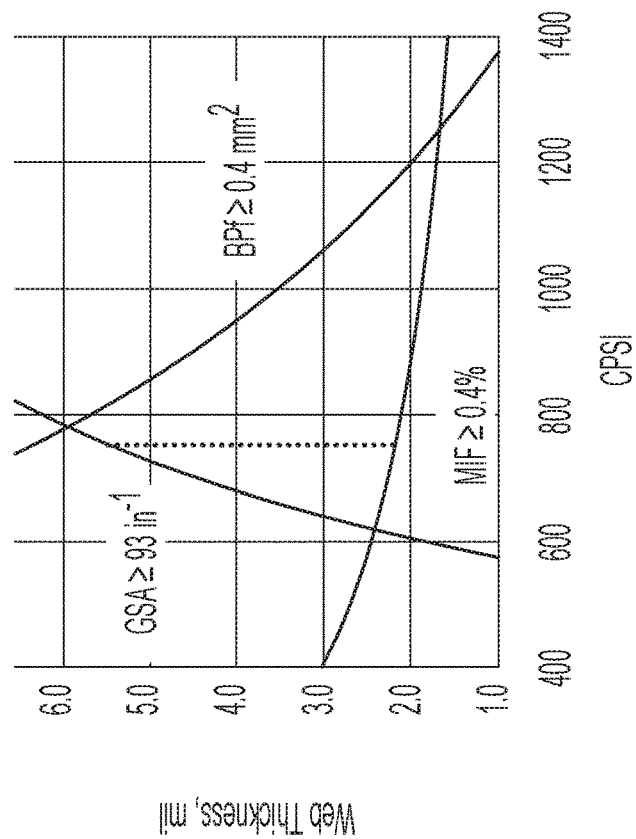

In a third embodiment, the ceramic honeycomb body comprises square cells and a bulk density of less than 210 g/L, a geometric surface area (GSA) greater than 93 in$^{-1}$ (3.66 mm$^{-1}$), a mechanical integrity factor (MIF) greater than 0.4%, and a back pressure factor (BPF) greater than 0.4 mm$^2$, however, in alternative embodiments, the shape of the cells is not limited to square cells. FIGS. 4A and 4B are graphs illustrating selection of parameters according to the third embodiment. FIG. 4A plots web thickness versus CPSI, and the region bounded by the GSA, MIF and BPF lines defines a range of web thickness and CPSI values encompassed by the third embodiment. FIG. 4B plots porosity against web thickness in mils for an exemplary embodiment at 750 CPSI, and the dotted line region depicts a region encompassing ranges of % porosity and web thicknesses that can be utilized and meet the range of parameters shown in FIG. 4A in accordance with the third embodiment. The % porosity of the honeycomb body can range from approximately 30% to 80% for a web thickness of about 2.25 mils and a % porosity in a range of from about 70% to about 80% for a web thickness of about 5.5 mils (139.7 µm).

Figure 5B:
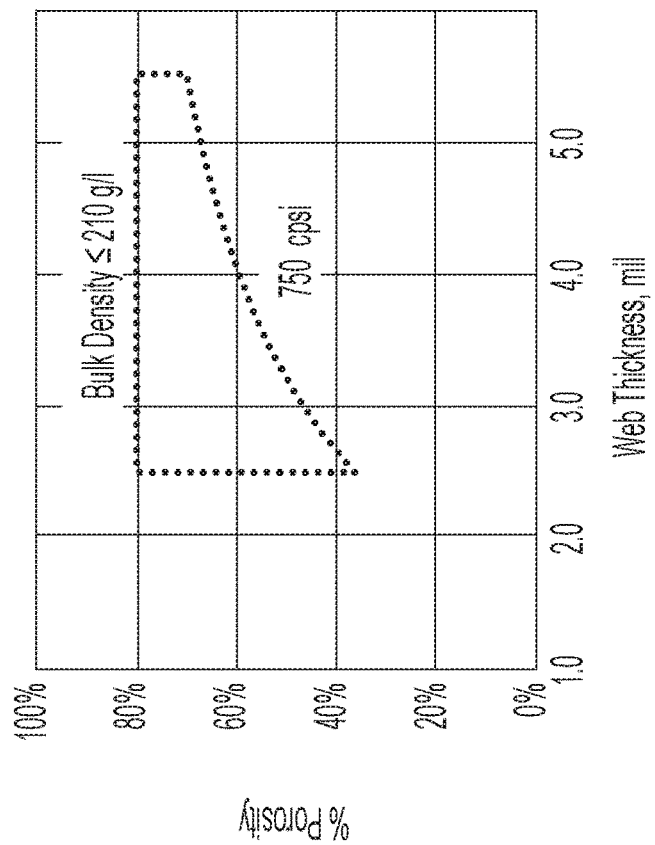
FIGS. 5A and 5B are graphs illustrating selection of parameters according to an embodiment of a cordierite honeycomb body with square cells.
Figure 5A:
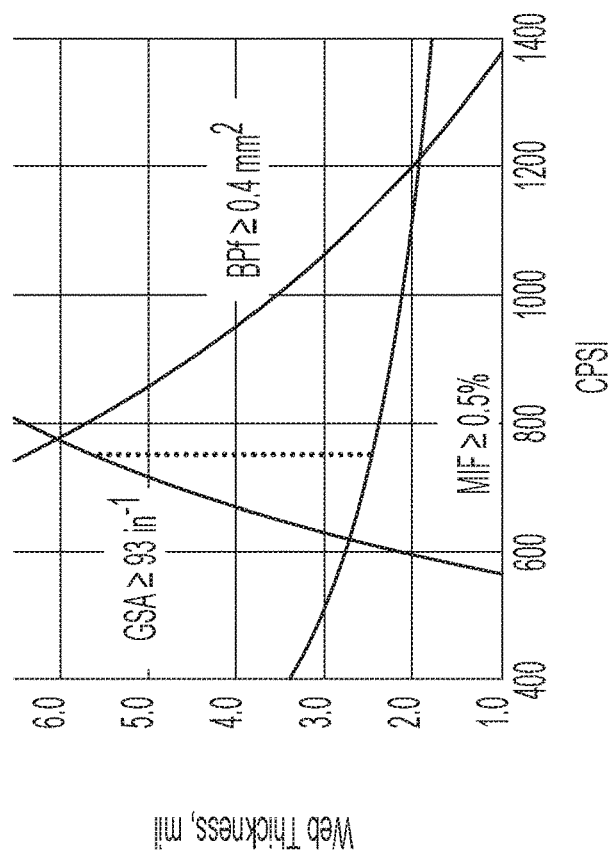

In a fourth embodiment, the ceramic honeycomb body comprises square cells and comprises a bulk density of less than 210 g/L, a geometric surface area (GSA) greater than 93 in$^{-1}$ (3.66 mm$^{-1}$), a mechanical integrity factor (MIF) greater than 0.5%, and a back pressure factor (BPF) greater than 0.4 mm$^2$, however, in alternative embodiments, the shape of the cells is not limited to square cells. FIG. 5A plots web thickness versus CPSI, and the region bounded by the GSA, MIF and BPF lines defines a range of web thickness and CPSI values encompassed by the fourth embodiment. FIG. 5B plots porosity against web thickness in mils for an exemplary embodiment at 750 CPSI, and the dotted line region depicts a region encompassing ranges of % porosity and web thicknesses that can be utilized and meet the range of parameters shown in FIG. 5A in accordance with the fourth embodiment. The % porosity of the honeycomb body can range from approximately 37% to 80% for a web thickness of about 2.5 mils and a % porosity in a range of from about 70% to about 80% for a web thickness of about 5.5 mils (139.7 μm).

Figure 6B:
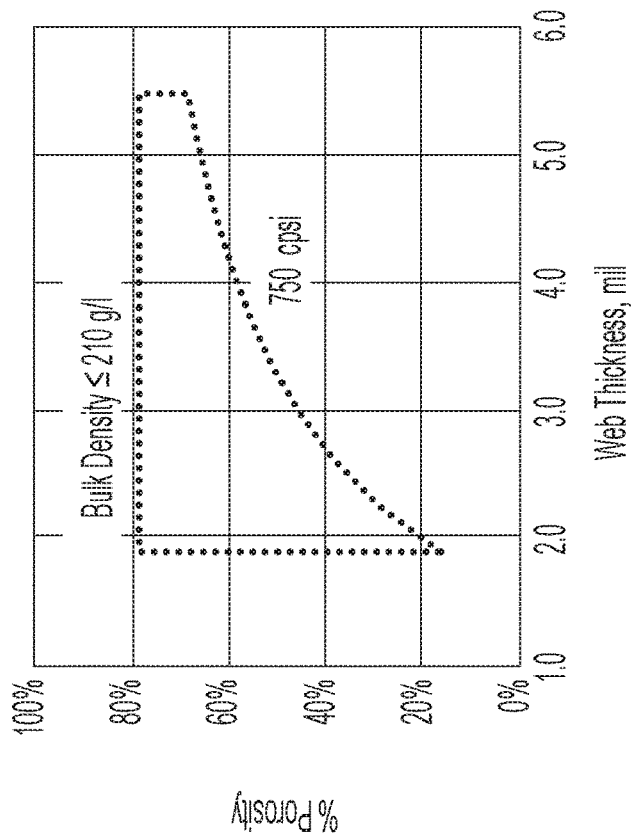
FIGS. 6A and 6B are graphs illustrating selection of parameters according to an embodiment of a cordierite honeycomb body with square cells.
Figure 6A:
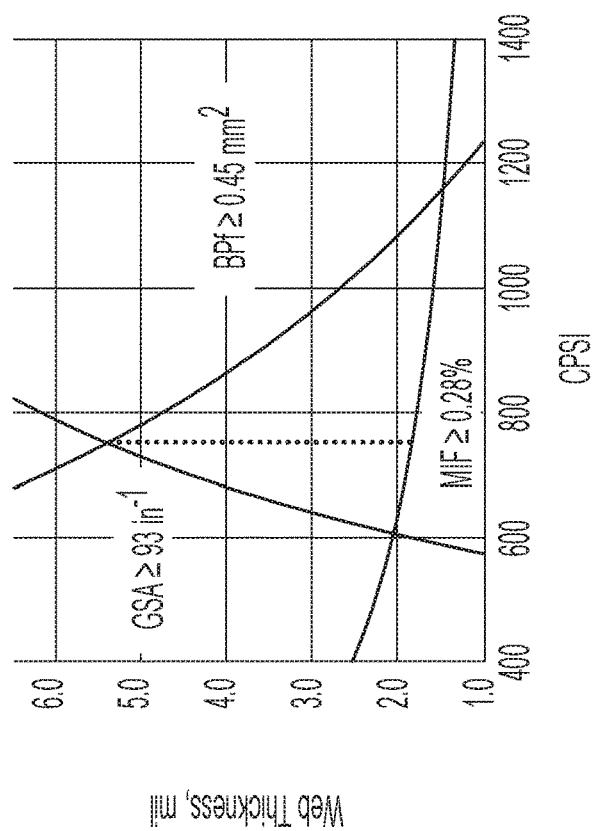

In a fifth embodiment, the ceramic honeycomb body comprises square cells and comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.45 mm$^2$, however, in alternative embodiments, the shape of the cells is not limited to square cells. FIG. 6A plots web thickness versus CPSI, and the region bounded by the GSA, MIF and BPF lines defines a range of web thickness and CPSI values encompassed by the fifth embodiment. FIG. 6B plots porosity against web thickness in mils for an exemplary embodiment at 750 CPSI, and the dotted line region depicts a region encompassing ranges of % porosity and web thicknesses that can be utilized and meet the range of parameters shown in FIG. 6A in accordance with the fifth embodiment. The % porosity of the honeycomb body can range from approximately 17% to 80% for a web thickness of about 1.9 mils (48.26 μm) and a % porosity in a range of from about 70% to about 80% for a web thickness of about 5.5 mils (139.7 μm).

Figure 7B:
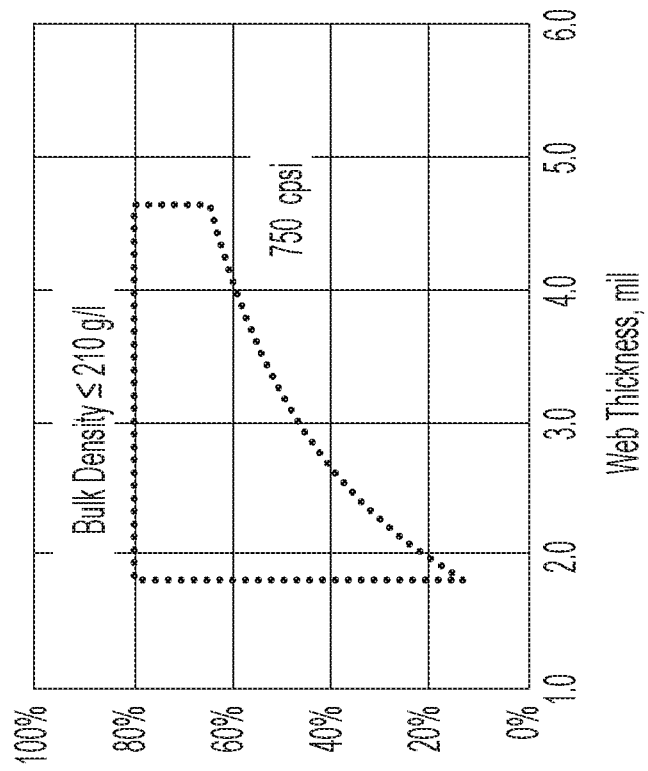
FIGS. 7A and 7B are graphs illustrating selection of parameters according to an embodiment of a cordierite honeycomb body with square cells.
Figure 7A:
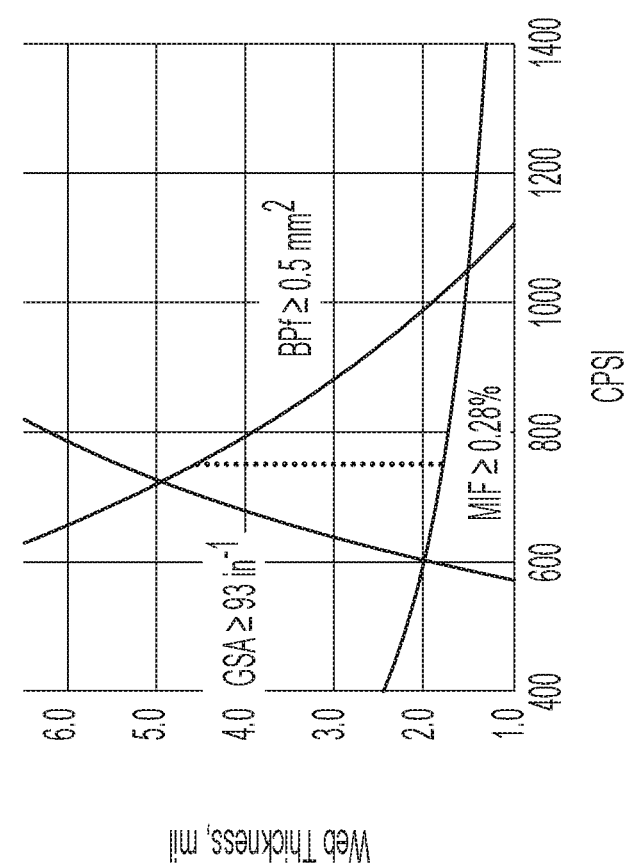

In a sixth embodiment, the ceramic honeycomb body comprises square cells and comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.5 mm$^2$, however, in alternative embodiments, the shape of the cells is not limited to square cells. FIG. 7A plots web thickness versus CPSI, and the region bounded by the GSA, MIF and BPF lines defines a range of web thickness and CPSI values encompassed by the sixth embodiment. FIG. 7B plots porosity against web thickness in mils for an exemplary embodiment at 750 CPSI, and the dotted line region depicts a region encompassing ranges of % porosity and web thicknesses that can be utilized and meet the range of parameters shown in FIG. 7A in accordance with the sixth embodiment. The % porosity of the honeycomb body can range from approximately 14% to 80% for a web thickness of about 1.8 mils (45.72 μm) and a % porosity in a range of from about 65% to about 80% for a web thickness of about 4.6 mils (116.84 μm).

Figure 8B:
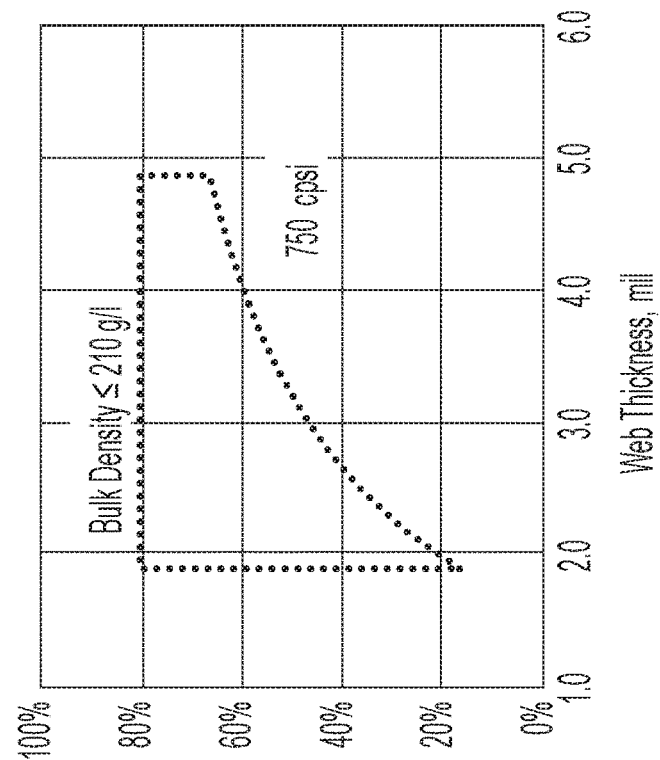
FIGS. 8A and 8B are graphs illustrating selection of parameters according to an embodiment of a cordierite honeycomb body with square cells.
Figure 8A:
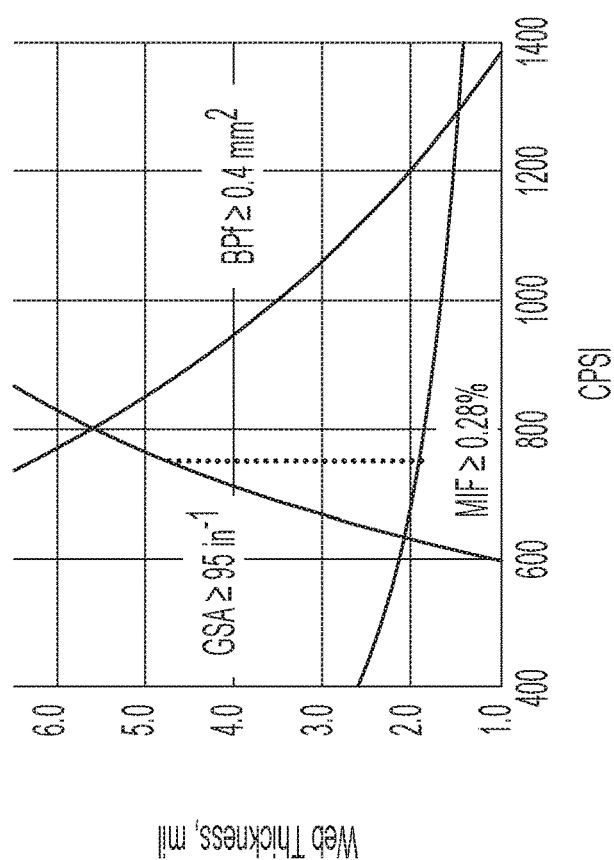

In a seventh embodiment, the ceramic honeycomb body comprises square cells and comprises a bulk density of less than 210 g/L, a geometric surface area (GSA) greater than 95 in$^{-1}$, a mechanical integrity factor (MIF) greater than 0.28%, and a back pressure factor (BPF) greater than 0.4 mm$^2$, however, in alternative embodiments, the shape of the cells is not limited to square cells. FIG. 8A plots web thickness versus CPSI, and the region bounded by the GSA, MIF and BPF lines defines a range of web thickness and CPSI values encompassed by the seventh embodiment. FIG. 8B plots porosity against web thickness in mils for an exemplary embodiment at 750 CPSI, and the dotted line region depicts a region encompassing ranges of % porosity and web thicknesses that can be utilized and meet the range of parameters shown in FIG. 8A in accordance with the seventh embodiment. The % porosity of the honeycomb body can range from approximately 17% to 80% for a web thickness of about 1.9 mils (48.26 μm) and a % porosity in a range of from about 66% to about 80% for a web thickness of about 4.8 mils (121.92)

Figure 9B:
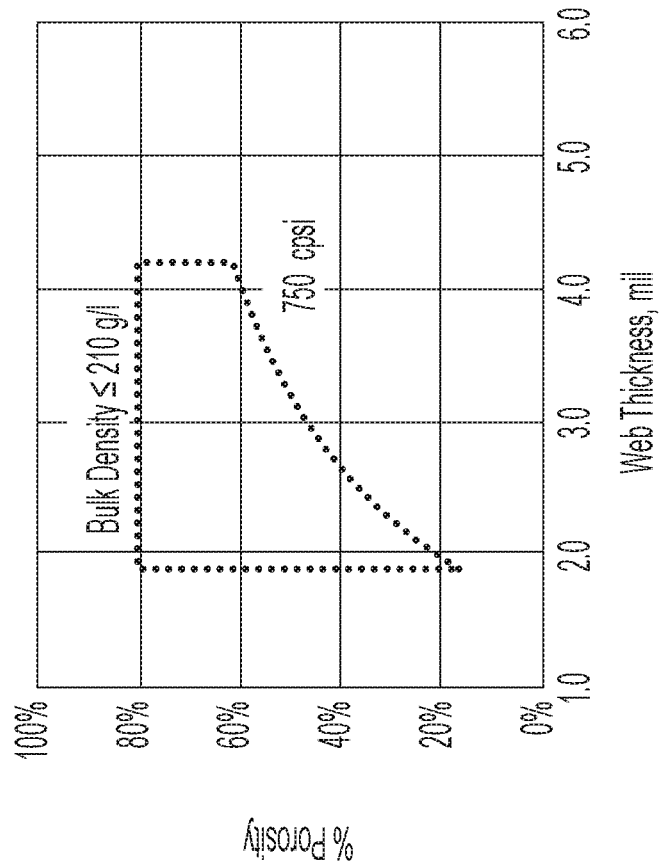
FIGS. 9A and 9B are graphs illustrating selection of parameters according to an embodiment of a cordierite honeycomb body with square cells.
Figure 9A:
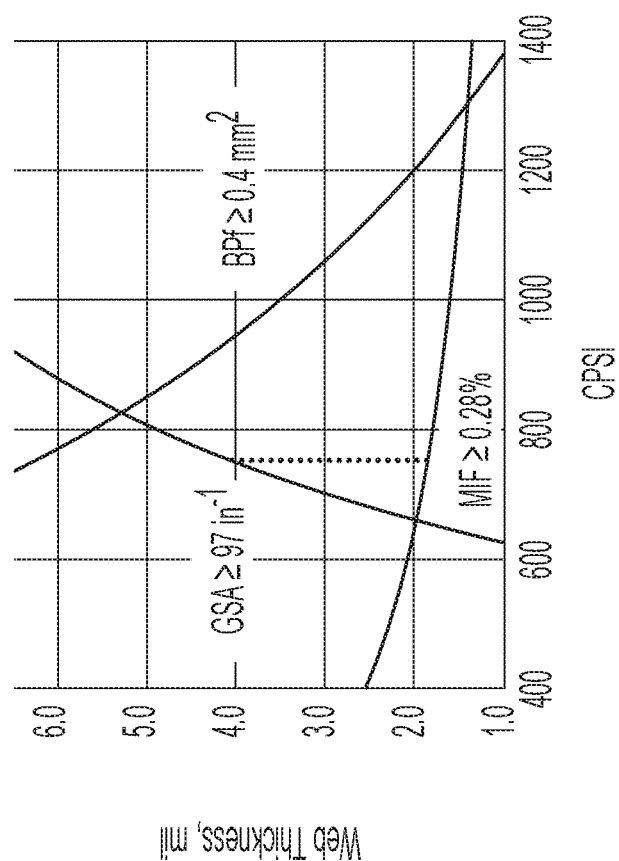

In an eighth embodiment, the ceramic honeycomb body comprises square cells and comprises a bulk density of less than 210 g/L, a geometric surface area (GSA) greater than 97 in$^{-1}$ (3.82 mm$^{-1}$), a mechanical integrity factor (MIF) greater than 0.28%, and a back pressure factor (BPF) greater than 0.4 mm$^2$, however, in alternative embodiments, the shape of the cells is not limited to square cells. FIG. 9A plots web thickness versus CPSI, and the region bounded by the GSA, MIF and BPF lines defines a range of web thickness and CPSI values encompassed by the eighth embodiment. FIG. 9B plots porosity against web thickness in mils for an exemplary embodiment at 750 CPSI, and the dotted line region depicts a region encompassing ranges of % porosity and web thicknesses that can be utilized and meet the range of parameters shown in FIG. 9A in accordance with the eighth embodiment. The % porosity of the honeycomb body can range from approximately 17% to 80% for a web thickness of about 1.9 mils (48.26 μm) and a % porosity in a range of from about 61% to about 80% for a web thickness of about 4.2 mils (106.88 μm).

In a ninth embodiment, the cells are hexagonal in cross-section, and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$, however, in alternative embodiments, the shape of the cells is not limited to hexagonal cells.

Figure 10B:
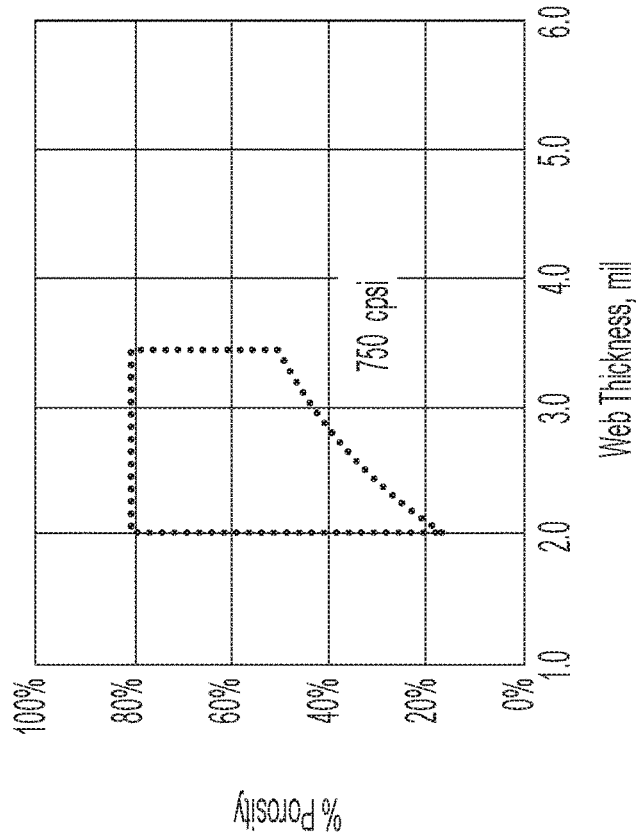
FIGS. 10A and 10B are graphs illustrating selection of parameters according to an embodiment of a cordierite honeycomb body with hexagonal cells.
Figure 10A:
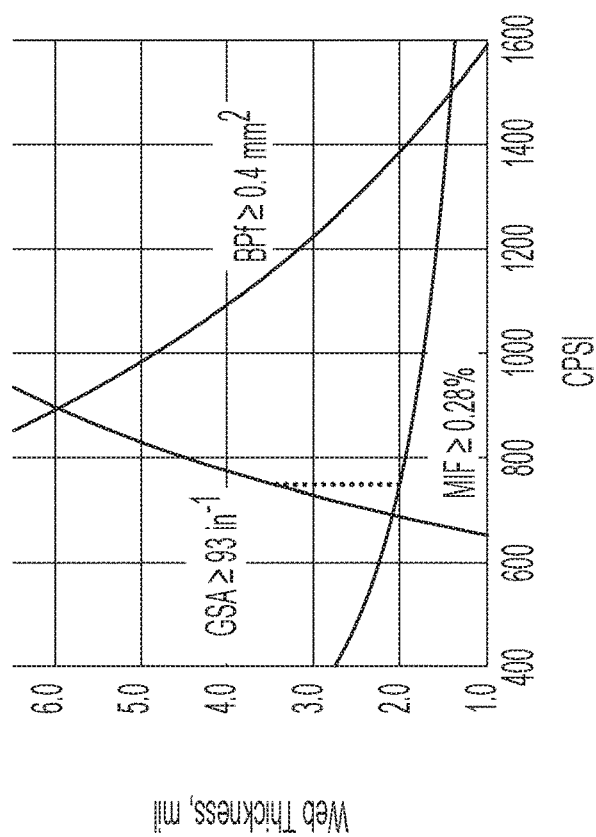

FIG. 10A plots web thickness versus CPSI, and the region bounded by the GSA, MIF and BPF lines defines a range of web thickness and CPSI values encompassed by the ninth embodiment. FIG. 10B plots porosity against web thickness in mils for an exemplary embodiment at 750 CPSI, and the dotted line region depicts a region encompassing ranges of % porosity and web thicknesses that can be utilized and meet the range of parameters shown in FIG. 10A in accordance with the ninth embodiment. The % porosity of the honeycomb body can range from approximately 17% to 80% for a web thickness of about 2.0 mils and a % porosity in a range of from about 50% to about 80% for a web thickness of about 3.4 mils.

Figure 11B:
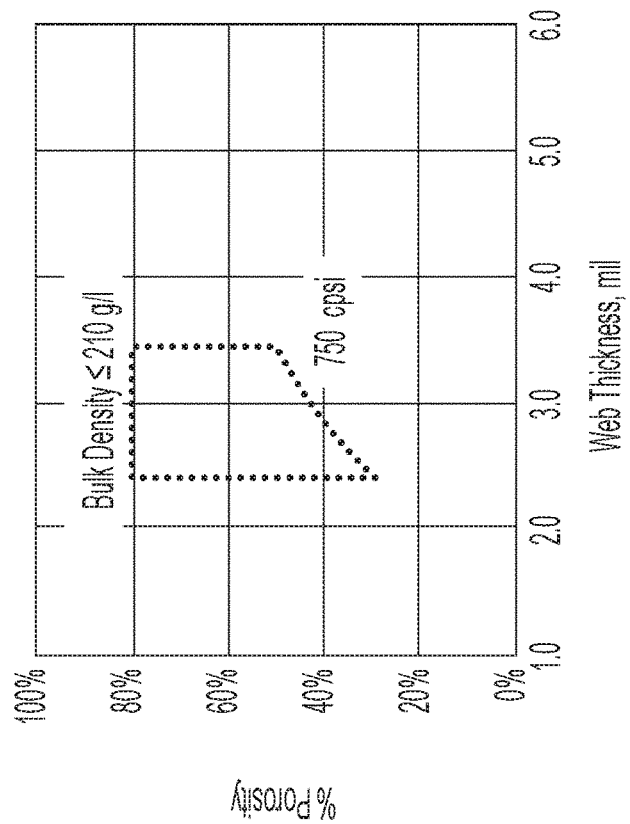
FIGS. 11A and 11B are graphs illustrating selection of parameters according to an embodiment of a cordierite honeycomb body with hexagonal cells.
Figure 11A:
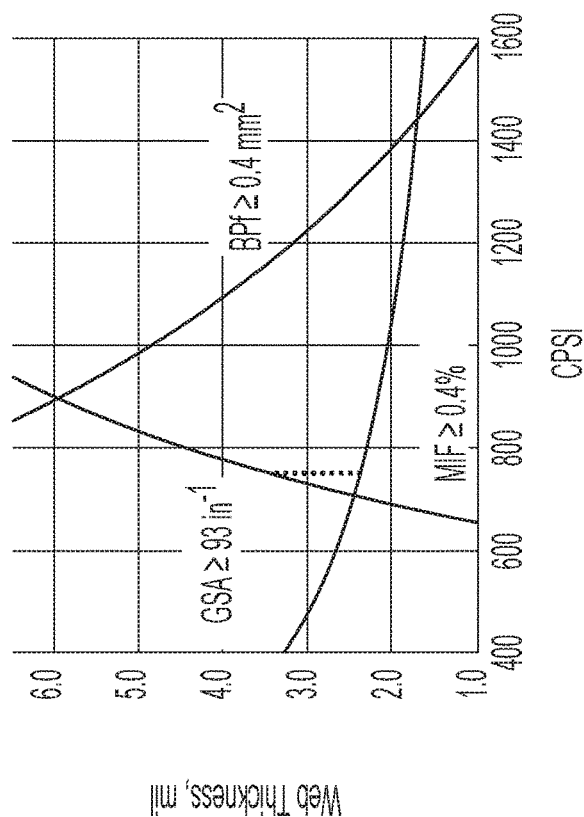

In a tenth embodiment, the cells are hexagonal in cross-section, and the ceramic honeycomb body comprises a bulk density of less than 210 g/L, a geometric surface area (GSA) greater than 93 in$^{-1}$ (3.66 mm$^{-1}$) a mechanical integrity factor (MIF) greater than 0.4%, and a back pressure factor (BPF) greater than 0.4 mm$^2$, however, in alternative embodiments, the shape of the cells is not limited to hexagonal cells. FIG. 11A plots web thickness versus CPSI, and the region bounded by the GSA, MIF and BPF lines defines a range of web thickness and CPSI values encompassed by the tenth embodiment. FIG. 11B plots porosity against web thickness in mils for an exemplary embodiment at 750 CPSI, and the dotted line region depicts a region encompassing ranges of % porosity and web thicknesses that can be utilized and meet the range of parameters shown in FIG. 11A in accordance with the tenth embodiment. The % porosity of the honeycomb body can range from approximately 30% to 80% for a web thickness of about 2.4 mils (60.96 μm) and a % porosity in a range of from about 50% to about 80% for a web thickness of about 3.4 mils (86.36 μm).

Figure 12B:
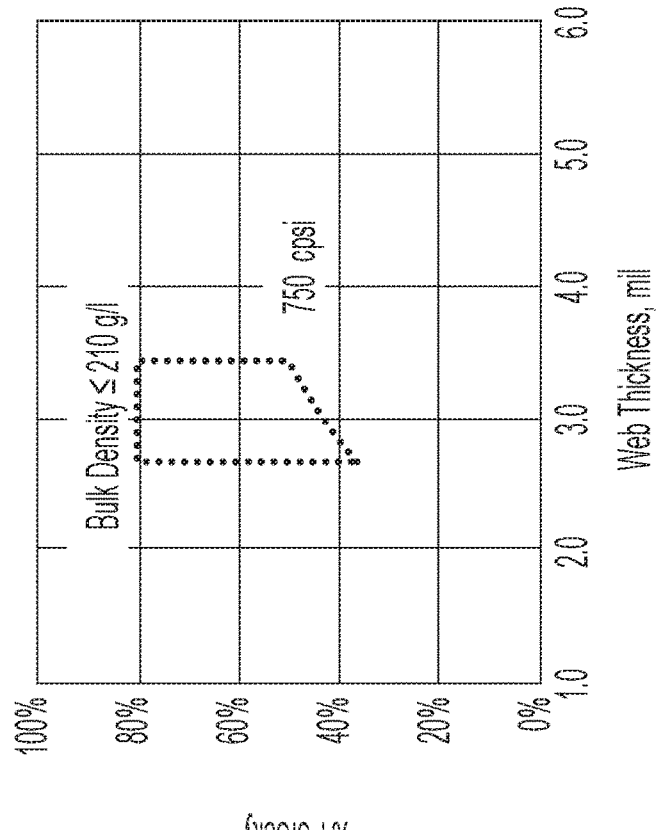
FIGS. 12A and 12B are graphs illustrating selection of parameters according to an embodiment of a cordierite honeycomb body with hexagonal cells.
Figure 12A:
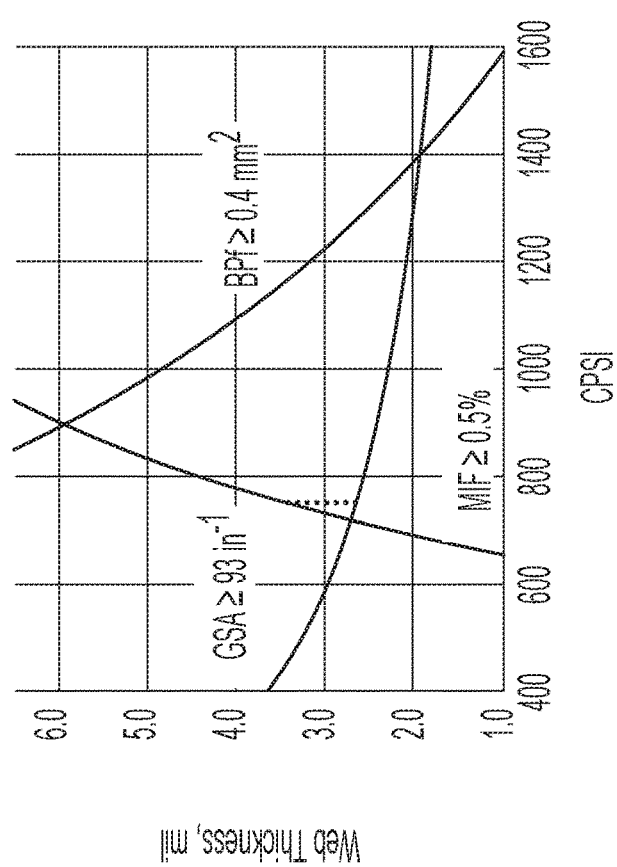

In an eleventh embodiment, the cells are hexagonal in cross-section, and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.5%, and a back pressure factor (BPF) greater than 0.4 mm$^2$, however, in alternative embodiments, the shape of the cells is not limited to hexagonal cells. FIG. 12A plots web thickness versus CPSI, and the region bounded by the GSA, MIF and BPF lines defines a range of web thickness and CPSI values encompassed by the eleventh embodiment. FIG. 12B plots porosity against web thickness in mils for an exemplary embodiment at 750 CPSI, and the dotted line region depicts a region encompassing ranges of % porosity and web thicknesses that can be utilized and meet the range of parameters shown in FIG. 12A in accordance with the eleventh embodiment. The % porosity of the honeycomb body can range from approximately 37% to 80% for a web thickness of about 2.7 mils (68.58 μm) and a % porosity in a range of from about 50% to about 80% for a web thickness of about 3.4 mils (86.36 μm).

Figure 13B:
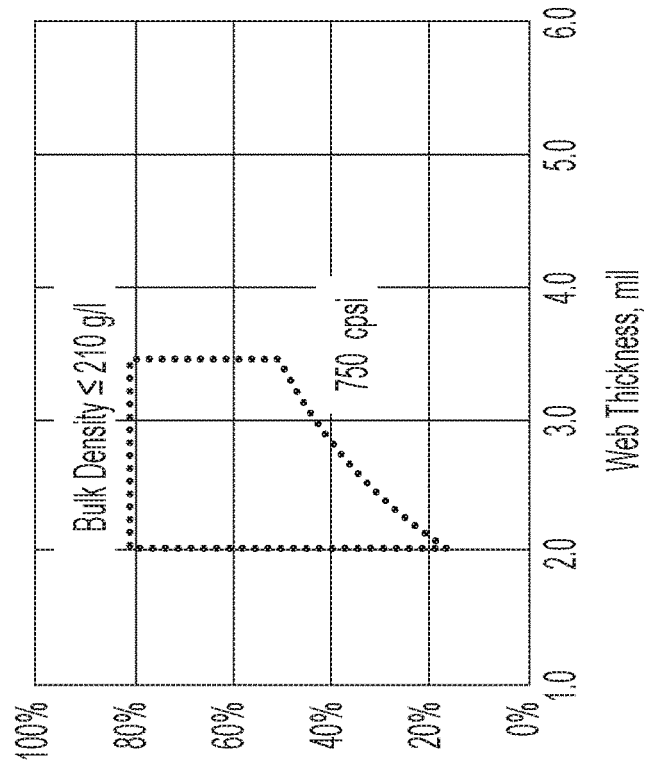
FIGS. 13A and 13B are graphs illustrating selection of parameters according to an embodiment of a cordierite honeycomb body with hexagonal cells.
Figure 13A:
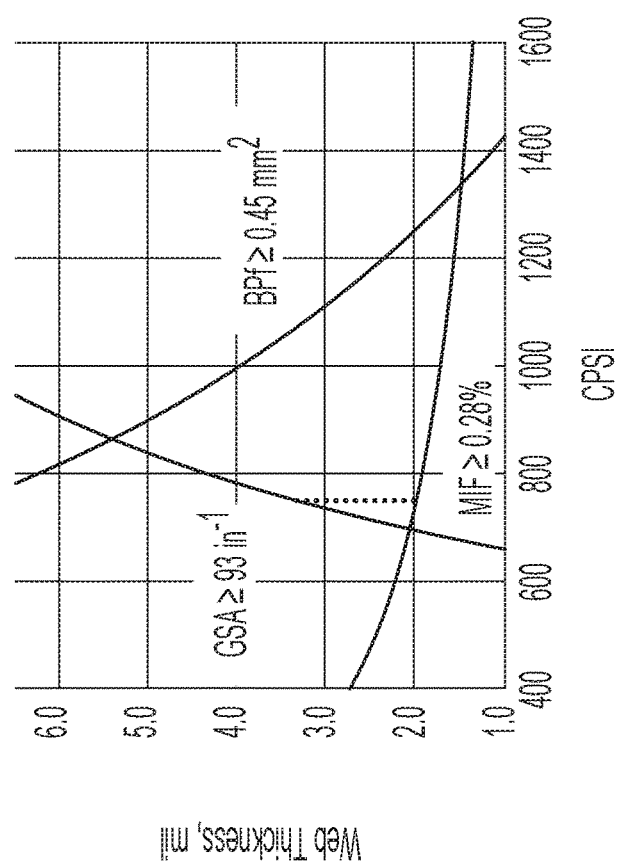

In a twelfth embodiment, the cells are hexagonal in cross-section, and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.45 mm$^2$, however, in alternative embodiments, the shape of the cells is not limited to hexagonal cells. FIG. 13A plots web thickness versus CPSI, and the region bounded by the GSA, MIF and BPF lines defines a range of web thickness and CPSI values encompassed by the twelfth embodiment. FIG. 13B plots porosity against web thickness in mils for an exemplary embodiment at 750 CPSI, and the dotted line region depicts a region encompassing ranges of % porosity and web thicknesses that can be utilized and meet the range of parameters shown in FIG. 13A in accordance with the twelfth embodiment. The % porosity of the honeycomb body can range from approximately 17% to 80% for a web thickness of about 2.0 mils (50.8 μm) and a % porosity in a range of from about 50% to about 80% for a web thickness of about 3.4 mils (86.36 μm).

Figure 14B:
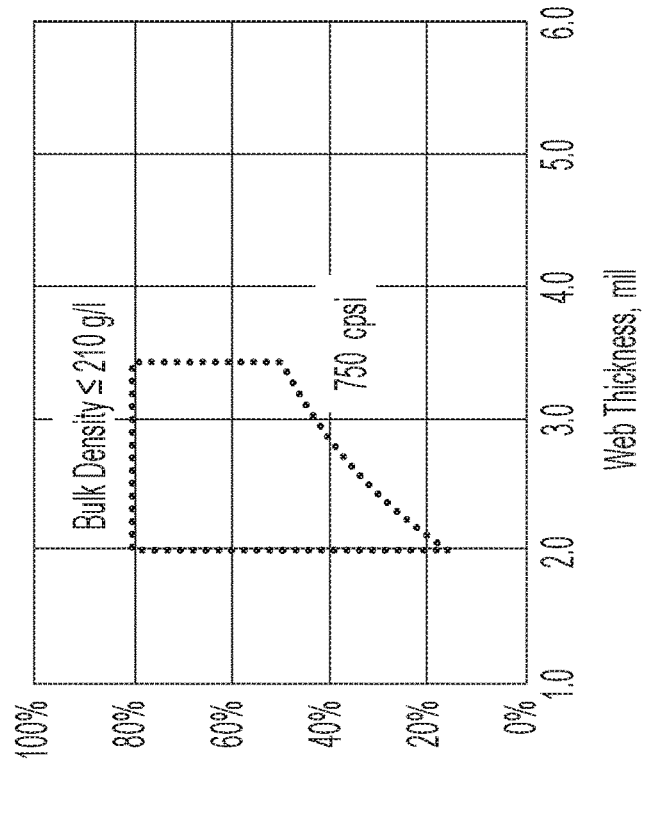
FIGS. 14A and 14B are graphs illustrating selection of parameters according to an embodiment of a cordierite honeycomb body with hexagonal cells.
Figure 14A:
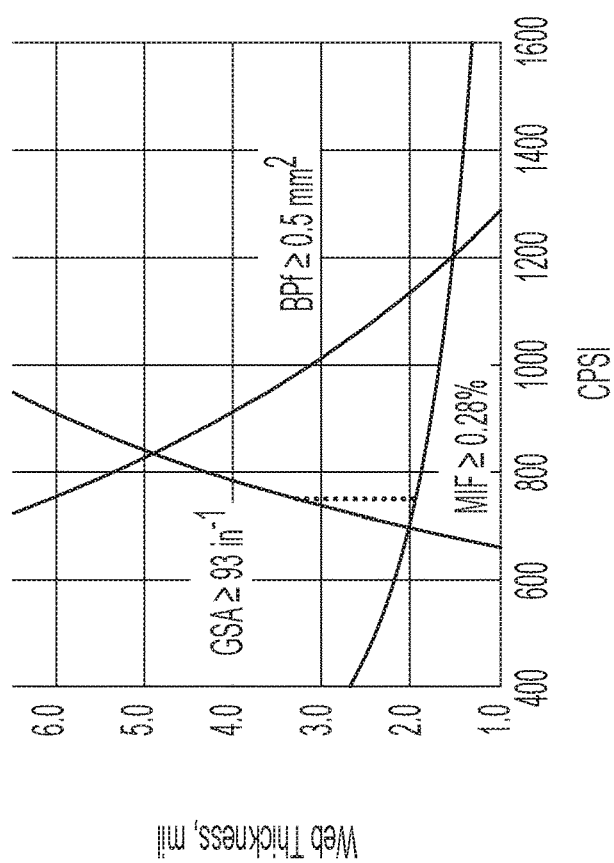

In an thirteenth embodiment, the cells are hexagonal in cross-section, and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.5 mm$^2$, however, in alternative embodiments, the shape of the cells is not limited to hexagonal cells. FIG. 14A plots web thickness versus CPSI, and the region bounded by the GSA, MIF and BPF lines defines a range of web thickness and CPSI values encompassed by the thirteenth embodiment. FIG. 14B plots porosity against web thickness in mils for an exemplary embodiment at 750 CPSI, and the dotted line region depicts a region encompassing ranges of % porosity and web thicknesses that can be utilized and meet the range of parameters shown in FIG. 14A in accordance with the thirteenth embodiment. The % porosity of the honeycomb body can range from approximately 17% to 80% for a web thickness of about 2.0 mils (50.8 μm) and a % porosity in a range of from about 50% to about 80% for a web thickness of about 3.4 mils (86.36 μm).

Figure 15B:
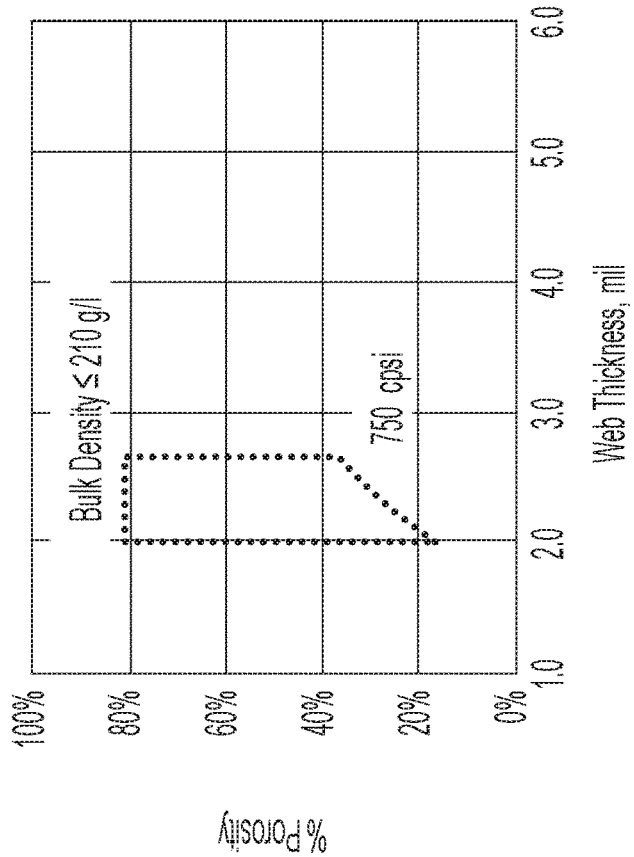
FIGS. 15A and 15B are graphs illustrating selection of parameters according to an embodiment of a cordierite honeycomb body with hexagonal cells.
Figure 15A:
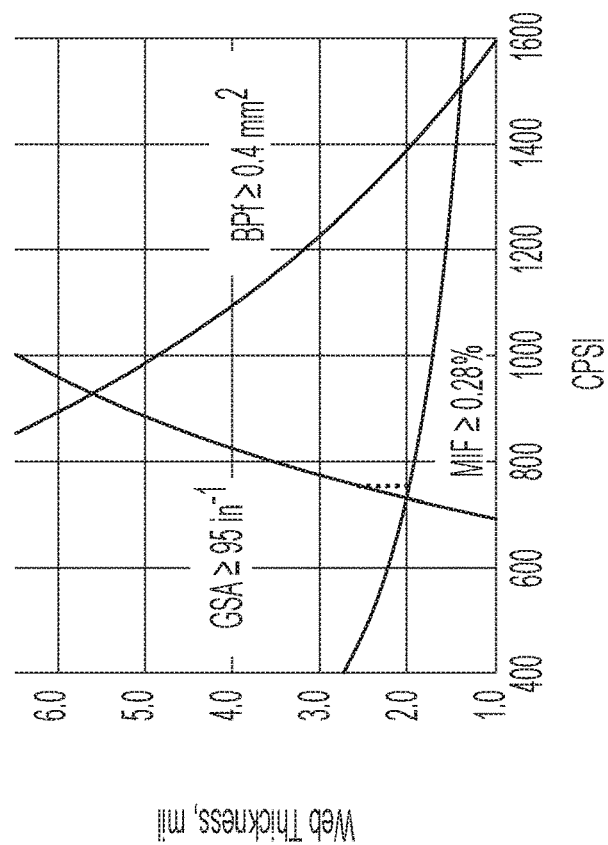

In a fourteenth embodiment, the cells are hexagonal in cross-section, and the ceramic honeycomb body comprises a bulk density of less than 210 g/L, a geometric surface area (GSA) greater than 95 in$^{-1}$ (3.74 mm$^{-1}$) a mechanical integrity factor (MIF) greater than 0.28%, and a back pressure factor (BPF) greater than 0.4 mm$^2$, however, in alternative embodiments, the shape of the cells is not limited to hexagonal cells. FIG. 15A plots web thickness versus CPSI, and the region bounded by the GSA, MIF and BPF lines defines a range of web thickness and CPSI values encompassed by the fourteenth embodiment. FIG. 15B plots porosity against web thickness in mils for an exemplary embodiment at 750 CPSI, and the dotted line region depicts a region encompassing ranges of % porosity and web thicknesses that can be utilized and meet the range of parameters shown in FIG. 15A in accordance with the fourteenth embodiment. The % porosity of the honeycomb body can range from approximately 17% to 80% for a web thickness of about 2.0 mils (50.8 μm) and a % porosity in a range of from about 36% to about 80% for a web thickness of about 2.7 mils (68.58 μm).

Figure 16B:
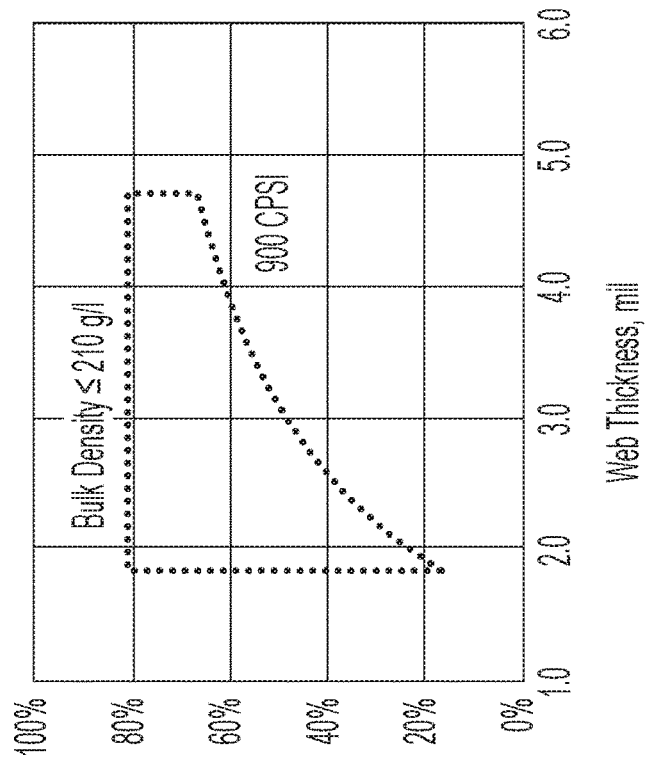
FIGS. 16A and 16B are graphs illustrating selection of parameters according to an embodiment of a cordierite honeycomb body with hexagonal cells.
Figure 16A:
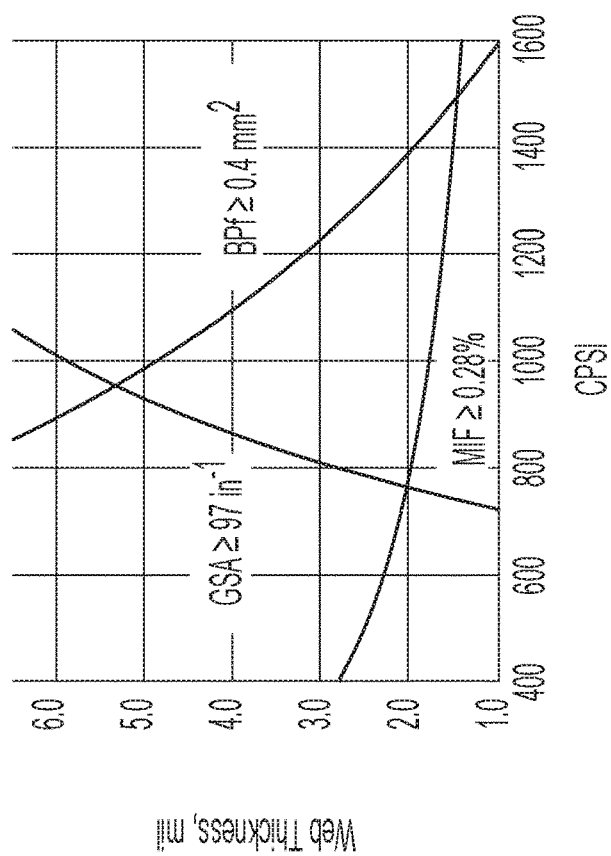

In a fifteenth embodiment, the cells are hexagonal in cross-section, and the ceramic honeycomb body comprises a bulk density of less than 210 g/L, a geometric surface area (GSA) greater than 97 in$^{-1}$ (3.74 mm$^{-1}$), a mechanical integrity factor (MIF) greater than 0.28%, and a back pressure factor (BPF) greater than 0.4 mm$^2$, however, in alternative embodiments, the shape of the cells is not limited to hexagonal cells. FIG. 16A plots web thickness versus CPSI, and the region bounded by the GSA, MIF and BPF lines defines a range of web thickness and CPSI values encompassed by the fifteenth embodiment. FIG. 16B plots porosity against web thickness in mils for an exemplary embodiment at 900 CPSI, and the dotted line region depicts a region encompassing ranges of % porosity and web thicknesses that can be utilized and meet the range of parameters shown in FIG. 16A in accordance with the fifteenth embodiment. The % porosity of the honeycomb body can range from approximately 17% to 80% for a web thickness of about 1.9 mils (48.26 μm) and a % porosity in a range of from about 66% to about 80% for a web thickness of about 4.7 mils (119.38 μm).

A sixteenth embodiment of the disclosure pertains to a method of manufacturing a ceramic honeycomb body comprising an inlet face, an outlet face, and a plurality of parallel, elongate, open-ended cells formed by intersecting cell walls having a web thickness ($t_w$) traversing the ceramic honeycomb body from the inlet face to the outlet face thereof. Each cell defines a perimeter P and cell area ($A_{cell}$), the open-ended cells comprising a cell density in cells per square inch (CPSI) and defining a percentage open frontal area (% OFA) of the ceramic honeycomb body, wherein % OFA=CPSI*$A_{cell}$, and the intersecting cell walls comprise a ceramic material having a density $\rho_c$ and a volume percentage porosity (% porosity). In specific embodiments, the ceramic material comprises cordierite. In other embodiments, the ceramic material consists essentially of or comprises cordierite. The method further comprises forming a mixture of starting materials including a pore forming agent, then extruding the mixture into a green honeycomb body, then firing the green honeycomb body to provide a formed ceramic honeycomb body comprising a predetermined CPSI and a predetermined web thickness so that the formed ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$.

In a seventeenth embodiment of the method, the cells are rectangular in cross-section. In an eighteenth embodiment of the method, the cells are rectangular in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.4%, and a back pressure factor (BPF) greater than 0.4 mm$^2$, however, in alternative embodiments, the shape of the cells is not limited to rectangular cells.

In a nineteenth embodiment of the method, the cells are rectangular in cross-section and the ceramic honeycomb body comprises a, bulk density of less than 210 g/L, a geometric surface area (GSA) greater than 93 in$^{-1}$ (3.66 mm$^{-1}$) a mechanical integrity factor (MIF) greater than 0.5%, and a back pressure factor (BPF) greater than 0.4 mm$^2$. In a twentieth embodiment of the method, the cells are rectangular in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.45 mm$^2$, however, in alternative embodiments, the shape of the cells is not limited to rectangular cells.

In a twenty-first embodiment of the method, the cells are rectangular in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.5 mm$^2$, however, in alternative embodiments, the shape of the cells is not limited to rectangular cells.

In a twenty-second embodiment of the method, the cells are rectangular in cross-section and the ceramic honeycomb body comprises a bulk density of less than 210 g/L, a geometric surface area (GSA) greater than 95 in$^{-1}$ (3.74 mm$^{-1}$), a mechanical integrity factor (MIF) greater than 0.28%, and a back pressure factor (BPF) greater than 0.4 mm$^2$, however, in alternative embodiments, the shape of the cells is not limited to rectangular cells.

In a twenty-third embodiment of the method, the cells are rectangular in cross-section and the ceramic honeycomb body comprises a bulk density of less than 210 g/L, a geometric surface area (GSA) greater than 97 in$^{-1}$ (3.82 mm$^{-1}$), a mechanical integrity factor (MIF) greater than 0.28%, and a back pressure factor (BPF) greater than 0.4 mm$^2$, however, in alternative embodiments, the shape of the cells is not limited to rectangular cells.

In a twenty-fourth embodiment of the method, the cells are hexagonal in cross-section and the formed ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.4 mm$^2$, however, in alternative embodiments, the shape of the cells is not limited to hexagonal cells.

In a twenty-fifth embodiment of the method, the cells are hexagonal in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.4%, and a back pressure factor (BPF) greater than 0.4 mm$^2$, however, in alternative embodiments, the shape of the cells is not limited to hexagonal cells.

In a twenty-sixth embodiment of the method, the cells are hexagonal in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.5%, and a back pressure factor (BPF) greater than 0.4 mm$^2$, however, in alternative embodiments, the shape of the cells is not limited to hexagonal cells.

In a twenty-seventh embodiment of the method, the cells are hexagonal in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.45 mm$^2$, however, in alternative embodiments, the shape of the cells is not limited to hexagonal cells.

In a twenty-eighth embodiment of the method, the cells are hexagonal in cross-section and the ceramic honeycomb body comprises a bulk density of less than 210 g/L, a geometric surface area (GSA) greater than 93 in$^{-1}$ (3.66 mm$^{-1}$), a mechanical integrity factor (MIF) greater than 0.28%, and a back pressure factor (BPF) greater than 0.5 mm$^2$, however, in alternative embodiments, the shape of the cells is not limited to hexagonal cells.

In a twenty-ninth embodiment of the method, the cells are hexagonal in cross-section and the ceramic honeycomb body comprises a bulk density of less than 210 g/L, a geometric surface area (GSA) greater than 95 in$^{-1}$ (3.74 mm$^{-1}$), a mechanical integrity factor (MIF) greater than 0.28%, and a back pressure factor (BPF) greater than 0.4 mm$^2$, however, in alternative embodiments, the shape of the cells is not limited to hexagonal cells.

In a thirtieth embodiment of the method, the cells are hexagonal in cross-section and the ceramic honeycomb body comprises a bulk density of less than 210 g/L, a geometric surface area (GSA) greater than 97 in$^{-1}$ (3.82 mm$^{-1}$), a mechanical integrity factor (MIF) greater than 0.28%, and a back pressure factor (BPF) greater than 0.4 mm$^2$, however, in alternative embodiments, the shape of the cells is not limited to hexagonal cells.

EXAMPLES

The examples exemplify honeycomb bodies having cells with cross-sectional shapes that are square and hexagonal, but the present disclosure is not limited to a cell with a particular cross-sectional shape.

Common honeycomb bodies that are currently commercially available are shown in Table 1.

TABLE 1

| Comparative Example | CPSI, cell/in$^2$ | Web Thickness, mil | Porosity % |
|---|---|---|---|
| 1 | 400 | 3.5 | 35% |
| 2 | 400 | 4.5 | 35% |
| 3 | 600 | 2.0 | 28% |
| 4 | 600 | 2.5 | 28% |
| 5 | 600 | 3.5 | 35% |
| 6 | 600 | 3.5 | 55% |
| 7 | 750 | 2.5 | 28% |
| 8 | 750 | 3.0 | 35% |
| 9 | 900 | 2.5 | 28% |

Calculations for honeycomb bodies having cells that are square-shaped in cross-section from Table 1 are shown in Table 2.

TABLE 2

| Comparative Example | OFA | Bulk Density, g/cm$^3$ | GSA, in$^{-1}$ | MIF, % | BPF, mm$^2$ |
|---|---|---|---|---|---|
| 1A | 86.5% | 220.4 | 74.4 | 0.53 | 1.21 |
| 2A | 82.8% | 280.5 | 72.8 | 0.89 | 1.11 |
| 3A | 90.4% | 172.7 | 93.2 | 0.25 | 0.88 |
| 4A | 88.1% | 214.6 | 92.0 | 0.40 | 0.84 |
| 5A | 83.6% | 267.8 | 89.6 | 0.80 | 0.75 |
| 6A | 83.6% | 185.4 | 89.6 | 0.80 | 0.75 |
| 7A | 86.8% | 239.0 | 102.0 | 0.50 | 0.65 |
| 8A | 84.2% | 257.1 | 100.5 | 0.74 | 0.61 |
| 9A | 85.6% | 260.9 | 111.0 | 0.61 | 0.52 |

TABLE 2-continued

| Comparative Example | OFA | Bulk Density, g/cm³ | GSA, in⁻¹ | MIF, % | BPF, mm² |
|---|---|---|---|---|---|

Calculations for honeycomb bodies having cells that are hexagonally shaped in cross-section from Table 1 are shown in Table 3.

TABLE 3

| Comparative Example | OFA | Bulk Density, g/cm³ | GSA, in⁻¹ | MIF, % | BPF, mm² |
|---|---|---|---|---|---|
| 1B | 87.4% | 205.6 | 69.6 | 0.45 | 1.42 |
| 2B | 84.0% | 261.8 | 68.2 | 0.77 | 1.31 |
| 3B | 91.1% | 161.0 | 87.0 | 0.22 | 1.03 |
| 4B | 88.9% | 200.1 | 86.0 | 0.34 | 0.98 |
| 5B | 84.7% | 249.9 | 83.9 | 0.69 | 0.89 |
| 6B | 84.7% | 173.0 | 83.9 | 0.69 | 0.89 |
| 7B | 87.7% | 223.0 | 95.4 | 0.43 | 0.76 |
| 8B | 85.3% | 239.9 | 94.1 | 0.63 | 0.72 |
| 9B | 86.5% | 243.5 | 103.9 | 0.52 | 0.62 |

Note that no products today meet all four targets for the inventive article, including bulk density<210 g/L with a GSA>93 in⁻¹, while maintaining a MIF>0.28%, and a BPF>0.4 mm².

Table 4 includes products that meet the inventive article by raising the porosity.

TABLE 4

| Example | CPSI, cell/in² | Web Thickness, mil | Porosity % |
|---|---|---|---|
| 10 | 750 | 3.00 | 55% |
| 11 | 800 | 3.00 | 55% |
| 12 | 900 | 2.50 | 55% |
| 13 | 750 | 2.50 | 45% |
| 14 | 750 | 3.00 | 28% |
| 15 | 800 | 3.00 | 28% |
| 16 | 900 | 2.50 | 28% |

Table 5 contains calculations for honeycomb bodies having cells that are square-shaped in cross-section from Table 4.

TABLE 5

| Example | OFA | Bulk Density, g/cm³ | GSA, in⁻¹ | MIF, % | BPF, mm² |
|---|---|---|---|---|---|
| 10A | 84.2% | 178.0 | 100.5 | 0.74 | 0.61 |
| 11A | 83.7% | 183.6 | 103.5 | 0.79 | 0.57 |
| 12A | 85.6% | 163.1 | 111.0 | 0.61 | 0.52 |
| 13A | 86.8% | 182.6 | 102.0 | 0.50 | 0.65 |
| 14A | 84.2% | 178.1 | 100.5 | 0.74 | 0.61 |
| 15A | 83.7% | 183.7 | 103.5 | 0.79 | 0.57 |
| 16A | 85.6% | 163.2 | 111.0 | 0.61 | 0.52 |

Table 6 contains calculations for honeycomb bodies having cells that are hexagonally-shaped in cross-section from Table 4.

TABLE 6

| Example | OFA | Bulk Density, g/cm³ | GSA, in⁻¹ | MIF, % | BPF, mm² |
|---|---|---|---|---|---|
| 10B | 85.3% | 166.1 | 94.1 | 0.63 | 0.72 |
| 11B | 84.8% | 171.3 | 97.0 | 0.68 | 0.67 |
| 12B | 86.5% | 152.2 | 103.9 | 0.52 | 0.62 |
| 13B | 87.7% | 170.3 | 95.4 | 0.43 | 0.76 |
| 14B | 85.3% | 166.2 | 94.1 | 0.63 | 0.72 |
| 15B | 84.8% | 171.5 | 97.0 | 0.68 | 0.67 |
| 16B | 86.5% | 152.3 | 103.9 | 0.52 | 0.62 |

Example 17 Optimized Square Cell Honeycomb Body

If the web thickness is fixed being no thinner than 2.5 mils (63.5 μm), then the cell density must be greater than 746 CPSI and less than 938 CPSI in order to maintain a GSA>95 in⁻¹ (3.74 mm⁻¹) a MIF>0.5, and a BPF, >0.5 mm². If the ceramic article is made with cordierite, then the porosity would have to be 39.6% (746 CPSI) increasing to 45.9% (938 CPSI) to meet the bulk density requirements.

Example 18 Optimized Square Cell

If the web thickness is fixed being no thinner than 3.5 mils (88.9 μm), then the cell density must be greater than 684 CPSI and less than 840 CPSI in order to maintain a GSA>95 in⁻¹ (3.74 mm⁻¹), a MIF>0.5, and a BPF, >0.5 mm². If the ceramic article is made with cordierite, then the porosity would have to be 54.4% (684 CPSI) increasing to 58.7% (840 CPSI) to meet the bulk density requirements.

Example 19 Optimized Hexagonal Cell Honeycomb Body

If the web thickness is fixed being no thinner than 2.5 mils (63.5 μm), then the cell density must be greater than 861 CPSI and less than 1083 CPSI in order to maintain a GSA>95 in⁻¹ (3.74 mm⁻¹) a MIF>0.5, and a BPF, >0.5 mm². If the ceramic article is made with cordierite, then the porosity would have to be 39.6% (861 CPSI) increasing to 45.9% (1083 CPSI) to meet the bulk density requirements.

Example 20 Optimized Hexagonal Cell Honeycomb Body

If the web thickness is fixed being no thinner than 3.5 mils (88.9 μm), then the cell density must be greater than 790 CPSI and less than 971 CPSI in order to maintain a GSA>95 in⁻¹ (3.74 mm⁻¹), a MIF>0.5, and a BPF, >0.5 mm². If the ceramic article is made with cordierite, then the porosity would have to be 54.4% (790 CPSI) increasing to 58.7% (971 CPSI) to meet the bulk density requirements.

What is claimed is:

1. A ceramic honeycomb body comprising:
an inlet face, an outlet face, and a plurality of parallel, elongate, open-ended cells formed by a web of intersecting cell walls having a web thickness ($t_w$) traversing the ceramic honeycomb body from the inlet face to the outlet face thereof, each cell defining a cell perimeter P and cell area ($A_{cell}$), the open-ended cells configured with a cell density in cells per square inch (CPSI) and defining a percentage open frontal area (% OFA) of the ceramic honeycomb body, wherein % OFA=CPSI*$A_{cell}$, the intersecting cell walls comprising a ceramic material having a density $\rho_c$ and a volume percentage porosity (% porosity), wherein the ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.4 mm$^2$.

2. The ceramic honeycomb body of claim 1, wherein the ceramic honeycomb body comprises a bulk density of less than 210 g/L, a geometric surface area (GSA) greater than 93 in$^{-1}$, a mechanical integrity factor (MIF) greater than 0.4%, and a back pressure factor (BPF) greater than 0.4 mm$^2$.

3. The ceramic honeycomb body of claim 1, wherein the ceramic honeycomb body comprises a bulk density of less than 210 g/L, a geometric surface area (GSA) greater than 93 in$^{-1}$, a mechanical integrity factor (MIF) greater than 0.5%, and a back pressure factor (BPF) greater than 0.4 mm$^2$.

4. The ceramic honeycomb body of claim 1, wherein the ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.45 mm$^2$.

5. The ceramic honeycomb body of claim 1, wherein the ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.5 mm$^2$.

6. The ceramic honeycomb body of claim 1, wherein the ceramic honeycomb body comprises a bulk density of less than 210 g/L, a geometric surface area (GSA) greater than 95 in$^{-1}$, a mechanical integrity factor (MIF) greater than 0.28%, and a back pressure factor (BPF) greater than 0.4 mm$^2$.

7. The ceramic honeycomb body of claim 1, wherein the ceramic honeycomb body comprises a bulk density of less than 210 g/L, a geometric surface area (GSA) greater than 97 in$^{-1}$, a mechanical integrity factor (MIF) greater than 0.28%, and a back pressure factor (BPF) greater than 0.4 mm$^2$.

8. The ceramic honeycomb body of claim 1, wherein the cells are rectangular in cross-section.

9. The ceramic honeycomb body of claim 1, wherein the cells are hexagonal in cross-section.

10. The ceramic honeycomb body of claim 1, wherein the ceramic material of the intersecting cell walls comprises cordierite.

11. A method of manufacturing a ceramic honeycomb body comprising an inlet face, an outlet face, and a plurality of parallel, elongate, open-ended cells formed by intersecting cell walls having a web thickness ($t_w$) traversing the ceramic honeycomb body from the inlet face to the outlet face thereof, each cell defining a perimeter P and cell area ($A_{cell}$), the open-ended cells comprising a cell density in cells per square inch (CPSI) and defining a percentage open frontal area (% OFA) of the ceramic honeycomb body, wherein % OFA=CPSI*$A_{cell}$, the intersecting cell walls comprising a ceramic material having a density Pc and a volume percentage porosity (% porosity), wherein the method comprises forming a mixture of starting materials including a pore forming agent, then extruding the mixture into a green honeycomb body, then firing the green honeycomb body to provide a formed ceramic honeycomb body comprising a predetermined CPSI and a predetermined web thickness so that the formed ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.4 mm$^2$.

12. The method of claim 11, wherein the ceramic honeycomb body comprises a bulk density of less than 210 g/L, a geometric surface area (GSA) greater than 93 in$^{-1}$, a mechanical integrity factor (MIF) greater than 0.4%, and a back pressure factor (BPF) greater than 0.4 mm$^2$.

13. The method of claim 11, wherein the ceramic honeycomb body comprises a bulk density of less than 210 g/L, a geometric surface area (GSA) greater than 93 in$^{-1}$, a mechanical integrity factor (MIF) greater than 0.5%, and a back pressure factor (BPF) greater than 0.4 mm$^2$.

14. The method of claim 11, wherein the ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.45 mm$^2$.

15. The method of claim 11, wherein the ceramic honeycomb body comprises a bulk density of less than 210 g/L, a geometric surface area (GSA) greater than 93 in$^{-1}$, a mechanical integrity factor (MIF) greater than 0.28%, and a back pressure factor (BPF) greater than 0.5 mm$^2$.

16. The method of claim 11, wherein the ceramic honeycomb body comprises a bulk density of less than 210 g/L, a geometric surface area (GSA) greater than 95 in$^{-1}$, a mechanical integrity factor (MIF) greater than 0.28%, and a back pressure factor (BPF) greater than 0.4 mm$^2$.

17. The method of claim 11, wherein the ceramic honeycomb body comprises a bulk density of less than 210 g/L, a geometric surface area (GSA) greater than 97 in$^{-1}$, a mechanical integrity factor (MIF) greater than 0.28%, and a back pressure factor (BPF) greater than 0.4 mm$^2$.

18. The method of claim 11, wherein the cells are rectangular in cross-section.

19. The method of claim 11, wherein the cells are hexagonal in cross-section.

20. The method of claim 11, wherein the ceramic material of the intersecting cell walls comprises cordierite.

* * * * *

UNITED STATES PATENT AND TRADEMARK OFFICE
CERTIFICATE OF CORRECTION

| | | |
|---|---|---|
| PATENT NO. | : 12,194,449 B2 | Page 1 of 1 |
| APPLICATION NO. | : 17/601594 | |
| DATED | : January 14, 2025 | |
| INVENTOR(S) | : David Jack Bronfenbrenner et al. | |

It is certified that error appears in the above-identified patent and that said Letters Patent is hereby corrected as shown below:

On the Title Page

Item (57) under abstract first sentence: delete "then" and insert --their--

Signed and Sealed this
Twenty-seventh Day of January, 2026

John A. Squires
*Director of the United States Patent and Trademark Office*